Feb. 27, 1962     C. F. LAWLEY     3,022,599
AUTOMATIC BOBBER DEVICE

Filed March 30, 1960     2 Sheets-Sheet 1

INVENTOR:
Charles F. Lawley,
BY Alfred E. Ischinger.
ATTORNEY.

Feb. 27, 1962  C. F. LAWLEY  3,022,599
AUTOMATIC BOBBER DEVICE
Filed March 30, 1960  2 Sheets-Sheet 2

INVENTOR:
Charles F. Lawley,
BY
Alfred E. Ischinger,
ATTORNEY.

United States Patent Office 3,022,599
Patented Feb. 27, 1962

3,022,599
AUTOMATIC BOBBER DEVICE
Charles F. Lawley, 443 Wyoming Ave., Wyoming, Pa.
Filed Mar. 30, 1960, Ser. No. 18,693
2 Claims. (Cl. 43—43.11)

This invention relates generally to fishing tackle, and more particularly concerns a unique fishing device which serves as a float or bobber that becomes automatically operative when cast into the water to effect, substantially simultaneously, the release of fish food particles at the location of the device and the release of a fishing line section of a determined length that is initially compactly associated with the device in a certain connected manner and has fish snare means secured to its free end arranged to sink to a determined positioning depth below the device as established by the length of said fishing line section.

One object of my invention is to provide a novel fishing device of the type indicated.

Another object is to provide such a device which has certain structural and functional features of advantage over the similar devices of the prior art.

A further object is to provide such a device in the form of a float unit or bobber structure having cooperatively associated therewith certain fishing items in such a compact and unitary manner that the device can be accurately cast any desired distance without said items becoming dislodged, tangled, knotted, or otherwise ineffective in serving their intended purpose or function.

An additional object is to provide such a device which becomes operative, after it has been cast into the water, to automatically release the said fishing items so that they can carry out their intended purpose or function in cooperative relation with the float unit or bobber.

Another object is to provide such a device in which the said automatic means includes a water soluble element that disintegrates when the device is cast into the water and thereby actuates or triggers the automatic means so as to cause the release of a fishing line section carried by the device and its descent to a preselected depth.

Another feature resides in the provision of such a water soluble element that is composed of compacted food particles that have certain fish attracting qualities or characteristics, and which food particles are united by a water soluble binder or the like so as to effect an element of predetermined size and shape.

Another object is to provide such a device in which the said automatic means is in the form of a separate self-contained unitary structure that can readily be cooperatively attached to the body member of the float or bobber.

It is also an object to provide such a device in which the said separate self-contained unitary structure is attachable within the body member of the float or bobber in such manner as to effect the formation of an airtight chamber in the latter.

Another object is to provide such a device in the form of a small bobber unit of streamlined design which, during its casting flight, will have exposed to the retarding action of the air or wind, a lesser amount of surface area than the prior art devices which include similar component fishing items, so as to thereby facilitate casting of the device to points of greater distance.

It is also an object to provide such a device in which the previously referred to fishing line section of a determined length is connected or joined with the device in such manner as to become freely movable or slidable relative to the device after it has been released therefrom.

With these and other objects in view, which will become more readily apparent from the following detailed description of the practical and illustrative embodiment of the improvements shown in the accompanying drawings, my invention comprises the fishing device, elements, features of construction and arrangement of parts in cooperative relationship, as more particularly indicated and defined by the hereto appended claims.

The fishing device of my invention generally constitutes a float or bobber structure that comprises a body member 1, to which is internally fixedly secured an automatic unit 2, in a manner forming an airtight chamber 3 within the upper portion of the body member 1, which chamber 3 establishes the desired amount of buoyancy to effect floating of the device at the surface of the water.

The body member 1 is in the form of a streamlined shell, that may be generally bullet-shaped in design, as shown, or may have some other suitable configuration, and is made of a plastic waterproof material or the like.

Figure 8:
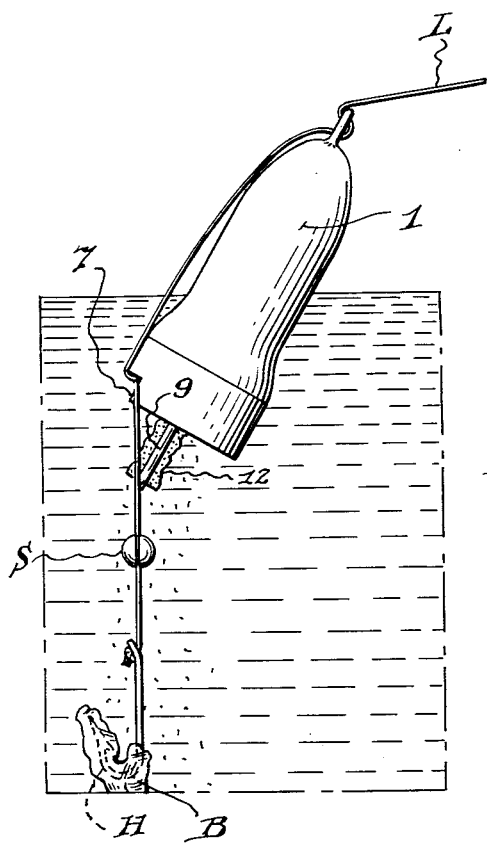
FIGS. 8 and 9 are similar elevational views which show my fishing device substantially as it appears after it has been cast into the water and during different phases of its automatic operation.
Figure 9:
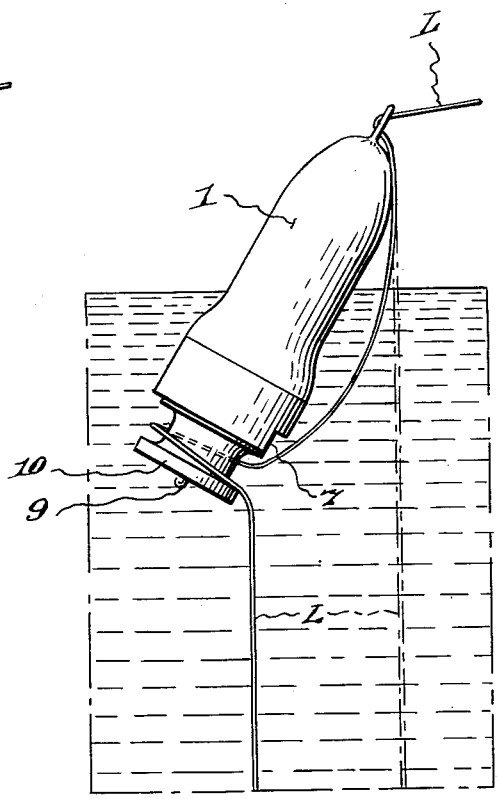

At its upper end, the body member 1 is provided with a short integral member or projection 4, having apertures 5 and 6, through which a fishing line L may be threaded or passed in reversed order as more particularly indicated in FIGS. 8 and 9. At its lower end, the wall of the body member 1 is cut away to form a substantially rectangular notch or opening, as indicated at 7.

The automatic unit 2 generally comprises a supporting member 8, an elongated U-shaped element 9 formed of stiff but bendable rust proof wire or the like, a spool-like member 10, a spiral compression spring 11 and a water soluble element, or pellet 12.

Figure 1:
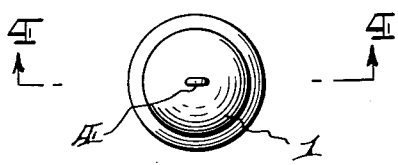
FIGURE 1 is a top view of one form of fishing device in accordance with my invention.
Figure 3:
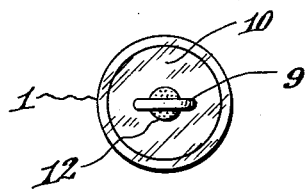
FIG. 3 is a bottom view of the device.
Figure 2:
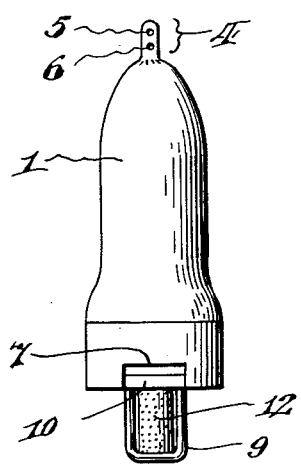
FIG. 2 is an elevational view of the device.
Figure 4:
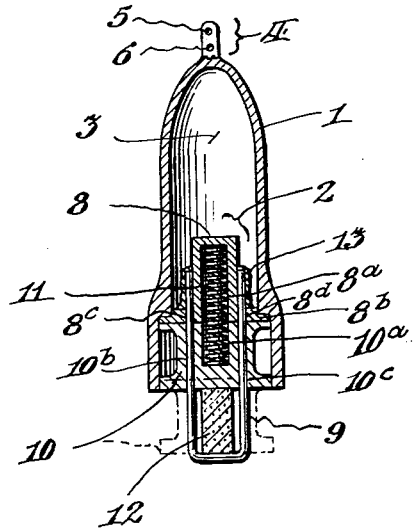
FIG. 4 is a central elevational sectional view, taken substantially as indicated by the arrow 4—4 on FIG. 1.

The supporting member 8 is provided with a central longitudinally extending bore or hole 8ª, that is located in axial registry with a similar bore or hole 10ª in the member 10 and said bores jointly form a suitable positioning socket or mounting arrangement for the spring 11, as clearly shown in FIG. 4.

The lower end of the member 8 is provided with a solid circular flange 8ᵇ having an offset or shouldered edge formation. Two circular apertures 8ᶜ and 8ᵈ are provided in the flange 8ᵇ for the extension therethrough of the free end portions of the legs of U-shaped element 9 and said leg end portions are fixedly secured to the outer surface of the member 8 by a suitable adhesive or the like indicated by the numeral 13.

The automatic unit 2 is fixedly united with the body member 1, in the positional relationship shown in FIG. 4. For this purpose an adhesive material or some other suitable means may be utilized that will effect an air and watertight joint or seal between the shouldered edge formation of the flange 8ᵇ at the lower end of the member 8 and the complementary internally shouldered surface arrangement of the body member 1.

Figure 5:
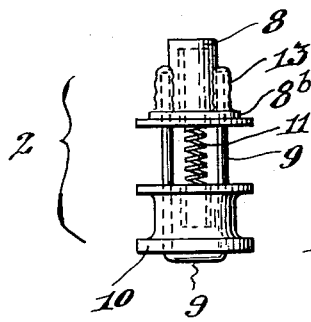
FIG. 5 is an elevational view of a separate self-contained unitary structure which forms part of my invention.
Figure 6:
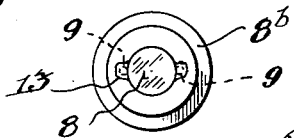
FIG. 6 is a top view of the structure shown in FIG. 5.
Figure 7:
FIG. 7 is a perspective view of one form of water soluble element which forms part of my invention.

The two legs of the U-shaped element 9 also extend through two apertures 10b and 10c provided therefor in the spool-like member 10, so that the latter can freely slide along said legs between the positions shown in FIGS. 4 and 5.

The cylindrical water soluble element or pellet 12 is composed of small fish food particles that are mixed with a water soluble adhesive material or the like to a paste-like consistency and then permitted to dry in a mold or some other element shaping device. When dry, the pellet 12 is sufficiently stiff or rigid to retain its configuration when compressed by the action of the spring 11 while mounted, as shown in FIG. 4, between the bottom surface of the spool-like member 10 and the horizontal portion of the U-shaped element 9. The said food particles of the pellet 12 may be of a type which, to fish, have taste and odor attractive qualities or characteristics. The said water soluble adhesive material is preferably of a type which will cause quick, or substantially immediate, disintegration of the pellet 12 when placed or submerged in water.

To combine the device of my invention with a fishing line and other fishing tackle appurtenances in readiness for a casting operation, the procedure is substantially as follows:

Assuming that the fishing line L which extends from a fishing or casting rod R (see FIG. 10) is engaged with the projection 4 at the upper end of the body member 1, as indicated in FIG. 9, so that the fishing line can be slidingly moved through the apertures 5 and 6; assuming also that the pellet 9 has been removed from its position shown in FIG. 4 so, that the spool-like member 10 will be projected by the spring 11 to a position substantially as indicated by the dot-and-dash outline thereof in FIG. 4; assuming further that the bobber device is to carry a predetermined amount, or length of the fishing line L, so that a hook H (see FIGS. 8 and 10) attached to the outer end thereof is to be positioned (after the device is cast into the water) at a location which is a certain desired distance below the device (which may vary from about three to forty feet), for example, a distance of twenty feet; then the outer or free end of the fishing line L having the hook H attached thereto, is slidingly pulled through the apertures 5 and 6 until the length of said line which extends from the hook H to the bottom of the device is twenty feet. This length or section of fishing line L, beginning at the point where the line portion extending from the aperture 6 reaches a position directly adjacent to the notch 7, is then wound onto the spool-like member 10 until only the end portion thereof having the hook H attached thereto extends from and beyond the spool-like member 10, substantially as indicated in FIG. 8. The spool-like member 10 is then slidingly pushed along the legs of the U-shaped member 9, into the lower end of the body member 1 and a pellet 12 is then placed in position to retain the spool-like member 10 with the fishing line section wound thereon, as indicated in FIG. 4. If desired, a sinker S may be attached to the fishing line in adjacent relation with the hook H. After the hook H has bait applied thereto, the assembly just described will then have an appearance substantially as indicated in FIG. 8 and is in readiness to be cast into the water by the fisherman.

Figure 10:
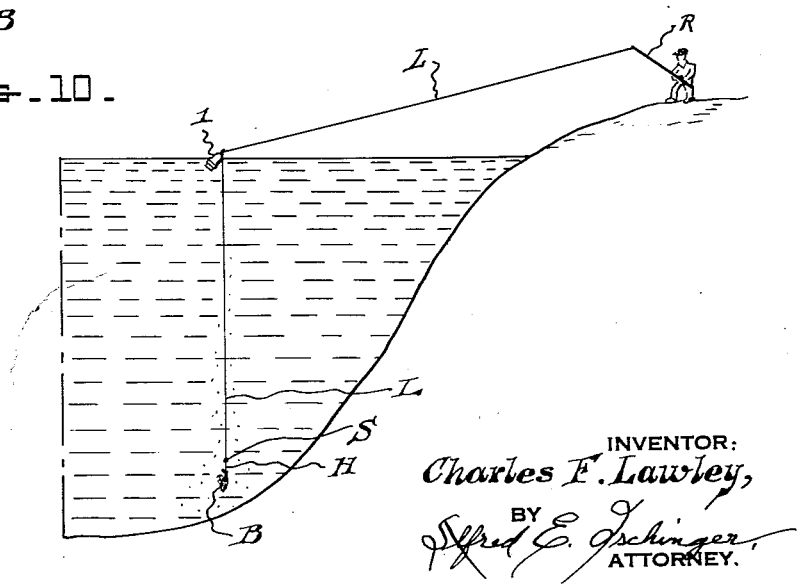
FIG. 10 is a view which illustrates approximately, the relative positions attained by the various parts of my fishing device when cast into the water by a fisherman with a casting rod.

After the fisherman has cast the bobber device into the water to a desired location from the shore, the pellet 12 will quickly disintegrate and in so doing, the fish food particles thereof will float about in the water in the general area of and below the device, as indicated by the dots in FIGS. 8 and 10. When the pellet disintegrating process has reached the point where the spool-like member 10 is automatically released and projected from the lower end of the body member 1 by the action of spring 11, as indicated in FIG. 9, the fishing line section which is wound on the member 10 will then quickly unwind itself, by the expanding action of its coils beyond the lower flange of the member 10, so that the hook H, the bait B and sinker S, will sink to a position twenty feet below the bobber device, as indicated in FIG. 10. At the same time the fish food particles will also sink and spread about the general area between and below the bobber device and the fish snare means, thereby attracting fish to the location of said means.

When the fishing line section below the device is connectedly suspended from the element 4 in a substantially straight line, as indicated by the dot-and-dash representation thereof shown in FIG. 9, reeling in, or pulling in, of the fishing line L, by the fisherman until the device reaches the latter and the body member 1 of the device is stopped by the eye at the tip of the fishing rod, will cause the said fishing line section that formerly extended below the device while in the water, to slidingly move, more or less freely, through the apertures 5 and 6 of the projection 4 at the top end of the body member 1 of the device.

It will be understood by those skilled in this art, that the bobber device or structure specifically shown and described, can be changed and modified in various ways without departing from the invention herein disclosed, the scope of which is more particularly indicated and defined by the hereto appended claims.

I claim:

1. A device of the character described which comprises two separate units that are combinable with each other in interconnected manner so as to provide the device with an airtight compartment; one of which units is in the form of a shell-like body member; and the other one of which units includes a mounting element, a U-shaped member the upper leg sections of which are fixedly secured to said mounting element, a spool that is arranged for sliding movement along the legs of said U-shaped member between two determined positions, and a compression spring arranged to effect movement of the spool from one of said positions to the other.

2. A device of the character described comprising, a shell-like body member having an upper tip portion provided with two relatively spaced apertures arranged for the reverse extension therethrough of a fishing line, a U-shaped member the upper leg sections of which are fixedly secured within said body member and the lower section of which extends beyond said body member, a spool for releasably retaining a determined length of the fishing line which spool is slidingly mounted on said U-shaped member for axial movement thereon between a position within said body member to a position outside thereof at which said length of fishing line will be released, and a water soluble element of such size as to be wedgingly positionable between the bottom surface of the spool and the crosswise extending section of the U-shaped member in such manner as to retain the spool in its position within the body member of the device.

References Cited in the file of this patent

UNITED STATES PATENTS

| | | |
|---|---|---|
| 2,528,799 | Strong | Nov. 7, 1950 |
| 2,694,878 | Martens | Nov. 23, 1954 |
| 2,888,771 | Stephens et al. | June 2, 1959 |
| 2,963,813 | Graham | Dec. 13, 1960 |

FOREIGN PATENTS

| | | |
|---|---|---|
| 1,054,574 | France | Oct. 7, 1953 |